United States Patent
Choi et al.

(10) Patent No.: US 9,712,312 B2
(45) Date of Patent: Jul. 18, 2017

(54) SYSTEMS AND METHODS FOR NEAR BAND INTERFERENCE CANCELLATION

(71) Applicant: Kumu Networks, Inc., Santa Clara, CA (US)

(72) Inventors: Jung-Il Choi, Sunnyvale, CA (US); Mayank Jain, Sunnyvale, CA (US); Dinesh Bharadia, Menlo Park, CA (US); Jeffrey Mehlman, Santa Clara, CA (US); Steven Hong, Sunnyvale, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 56 days.

(21) Appl. No.: 14/670,321

(22) Filed: Mar. 26, 2015

(65) Prior Publication Data

US 2015/0280893 A1    Oct. 1, 2015

Related U.S. Application Data

(60) Provisional application No. 61/970,852, filed on Mar. 26, 2014.

(51) Int. Cl.
*H04L 5/14* (2006.01)
*H04B 1/525* (2015.01)

(52) U.S. Cl.
CPC .............. *H04L 5/14* (2013.01); *H04B 1/525* (2013.01)

(58) Field of Classification Search
CPC .............................. H04B 1/525; H04L 5/1438
USPC ........................................ 370/202, 268, 281
See application file for complete search history.

(56) References Cited

U.S. PATENT DOCUMENTS

| | | | |
|---|---|---|---|
| 3,922,617 A | | 11/1975 | Denniston et al. |
| 4,321,624 A | * | 3/1982 | Gibson .................... H03D 3/26 348/735 |
| 4,952,193 A | | 8/1990 | Talwar |
| 5,212,827 A | | 5/1993 | Meszko et al. |

(Continued)

FOREIGN PATENT DOCUMENTS

| EP | 0755141 B1 | 10/2005 |
|---|---|---|
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

(Continued)

*Primary Examiner* — Melvin Marcelo
*Assistant Examiner* — Natali N Pascual Peguero
(74) *Attorney, Agent, or Firm* — Jeffrey Schox; Thomas Gwinn

(57) ABSTRACT

A method for self-interference canceller tuning for a near band radio includes receiving, in a first frequency band, an RF transmit signal of the near band radio; receiving, in a second frequency band, an RF receive signal of the near band radio; generating a self-interference cancellation signal from the RF transmit signal based on a set of configuration parameters; combining the self-interference cancellation signal with the RF receive signal to create a composite receive signal; and adapting the set of configuration parameters based on the compo-site receive signal.

12 Claims, 10 Drawing Sheets

(56) References Cited

U.S. PATENT DOCUMENTS

| | | |
|---|---|---|
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,240,150 B1 | 5/2001 | Darveau et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,657,950 B1 | 12/2003 | Jones et al. |
| 6,725,017 B2 | 4/2004 | Blount et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,509,100 B2 | 3/2009 | Toncich |
| 7,778,611 B2 | 8/2010 | Asai et al. |
| 7,869,527 B2 | 1/2011 | Vetter et al. |
| 8,005,235 B2 | 8/2011 | Rebandt, II et al. |
| 8,027,642 B2 | 9/2011 | Proctor et al. |
| 8,055,235 B1 | 11/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 | 4/2013 | Negus et al. |
| 8,755,756 B1 | 6/2014 | Zhang et al. |
| 8,842,584 B2 | 9/2014 | Jana et al. |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,077,421 B1 | 7/2015 | Mehlman et al. |
| 9,124,475 B2 | 9/2015 | Li et al. |
| 9,136,883 B1 | 9/2015 | Moher et al. |
| 9,184,902 B2 | 11/2015 | Khojastepour et al. |
| 9,231,647 B2 | 1/2016 | Polydoros et al. |
| 9,312,895 B1 | 4/2016 | Gupta et al. |
| 2002/0034191 A1* | 3/2002 | Shattil ............... H04L 1/04 370/464 |
| 2002/0064245 A1 | 5/2002 | McCorkle |
| 2002/0154717 A1 | 10/2002 | Shima et al. |
| 2002/0172265 A1* | 11/2002 | Kenney ............ H04B 1/7107 375/148 |
| 2003/0031279 A1 | 2/2003 | Blount et al. |
| 2003/0099287 A1 | 5/2003 | Arambepola |
| 2003/0104787 A1* | 6/2003 | Blount ............... H04B 1/525 455/67.13 |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0250466 A1* | 11/2005 | Varma ............... H04B 1/1027 455/296 |
| 2005/0254555 A1 | 11/2005 | Teague |
| 2005/0282500 A1 | 12/2005 | Wang et al. |
| 2006/0029124 A1 | 2/2006 | Grant et al. |
| 2006/0030277 A1 | 2/2006 | Cyr et al. |
| 2006/0058022 A1 | 3/2006 | Webster et al. |
| 2006/0083297 A1 | 4/2006 | Yan et al. |
| 2006/0209754 A1 | 9/2006 | Ji et al. |
| 2006/0273853 A1 | 12/2006 | Suzuki et al. |
| 2007/0018722 A1 | 1/2007 | Jaenecke |
| 2007/0105509 A1 | 5/2007 | Muhammad et al. |
| 2007/0207747 A1 | 9/2007 | Johnson et al. |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0089397 A1 | 4/2008 | Vetter et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219339 A1 | 9/2008 | Chrabieh et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0115912 A1 | 5/2009 | Liou et al. |
| 2009/0180404 A1 | 7/2009 | Jung et al. |
| 2009/0186582 A1 | 7/2009 | Muhammad et al. |
| 2009/0221231 A1 | 9/2009 | Weng et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0031036 A1 | 2/2010 | Chauncey et al. |
| 2010/0056166 A1 | 3/2010 | Tenny |
| 2010/0103900 A1 | 4/2010 | Yeh et al. |
| 2010/0117693 A1 | 5/2010 | Lorg et al. |
| 2010/0136900 A1 | 6/2010 | Seki |
| 2010/0150033 A1 | 6/2010 | Zinser et al. |
| 2010/0150070 A1 | 6/2010 | Park et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0026509 A1 | 2/2011 | Tanaka |
| 2011/0081880 A1* | 4/2011 | Ahn ............... H04B 1/1027 455/319 |
| 2011/0149714 A1 | 6/2011 | Rimini et al. |
| 2011/0171922 A1 | 7/2011 | Kim et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0250858 A1* | 10/2011 | Jain ............... H04W 16/14 455/120 |
| 2011/0254639 A1 | 10/2011 | Tsutsumi et al. |
| 2011/0256857 A1 | 10/2011 | Chen et al. |
| 2011/0268232 A1 | 11/2011 | Park et al. |
| 2011/0311067 A1 | 12/2011 | Harris et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2012/0224497 A1* | 9/2012 | Lindoff ............... H04B 1/525 370/252 |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0114468 A1 | 5/2013 | Hui et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0259343 A1* | 10/2013 | Liu ............... G01R 33/5611 382/131 |
| 2013/0301487 A1 | 11/2013 | Khandani |

(56) References Cited

U.S. PATENT DOCUMENTS

| | | | |
|---|---|---|---|
| 2013/0301488 A1* | 11/2013 | Hong | H04B 1/56 370/278 |
| 2013/0308717 A1 | 11/2013 | Maltsev et al. | |
| 2014/0011461 A1 | 1/2014 | Bakalski et al. | |
| 2014/0126437 A1 | 5/2014 | Patil et al. | |
| 2014/0169236 A1 | 6/2014 | Choi et al. | |
| 2014/0185533 A1* | 7/2014 | Haub | H04L 5/00 370/329 |
| 2014/0206300 A1 | 7/2014 | Hahn et al. | |
| 2014/0219139 A1 | 8/2014 | Choi et al. | |
| 2014/0219449 A1 | 8/2014 | Shattil et al. | |
| 2014/0313946 A1 | 10/2014 | Azadet | |
| 2014/0348018 A1 | 11/2014 | Bharadia et al. | |
| 2014/0348032 A1 | 11/2014 | Hua et al. | |
| 2014/0376416 A1 | 12/2014 | Choi | |
| 2015/0156003 A1 | 6/2015 | Khandani | |
| 2015/0156004 A1 | 6/2015 | Khandani | |
| 2015/0215937 A1 | 7/2015 | Khandani | |
| 2015/0249444 A1 | 9/2015 | Shin et al. | |
| 2015/0303984 A1 | 10/2015 | Braithwaite | |
| 2016/0218769 A1 | 7/2016 | Chang et al. | |

FOREIGN PATENT DOCUMENTS

| | | | |
|---|---|---|---|
| EP | 2237434 A1 | 10/2010 | |
| EP | 2267946 A2 | 12/2010 | |
| RU | 2256985 C2 | 7/2005 | |
| WO | WO 2013173250 A1 * | 11/2013 | H04W 16/14 |
| WO | 2013185106 A1 | 12/2013 | |
| WO | 2014093916 A1 | 6/2014 | |

OTHER PUBLICATIONS

McMichael et al., "Optimal Tuning of Analog Self-Interference Cancellers for Full-Duple Wireless Communication", Oct. 1-5, 2012, Fiftieth Annual Allerton Conference, Illinois, USA, pp. 246-251.

* cited by examiner

(12) United States Patent
US 9,712,312 B2

SYSTEMS AND METHODS FOR NEAR BAND INTERFERENCE CANCELLATION

CROSS-REFERENCE TO RELATED APPLICATIONS

This application claims the benefit of U.S. Provisional Application Ser. No. 61/970,852, filed on 26 Mar. 2014, which is incorporated in its entirety by this reference.

TECHNICAL FIELD

This invention relates generally to the wireless communications field, and more specifically to new and useful systems and methods for near band interference cancellation.

BACKGROUND

In traditional wireless communication systems, communications channels must generally be separated either in time or in frequency, due to the issue of self-interference. Wireless communications systems that separate communications channels by frequency, known as frequency division duplex (FDD) systems, may still suffer from self-interference issues if transmit and receive channels are close in frequency (near band) due to non-idealities in signal transmission and reception. In many cases, near band FDD may be desirable (or simply unavoidable); thus, there is a need in the wireless communications field to create new and useful systems and methods for near band interference cancellation. This invention provides such new and useful systems and methods.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Near Band Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource ever scarcer. As a result, spectral efficiency has become increasingly important to wireless communications systems.

One promising solution for increasing spectral efficiency is found in near band wireless communications systems; that is, wireless communications systems that are able to transmit and receive wireless signals at the same time on wireless channels that are close in frequency.

While near band wireless communications systems have substantial value to the wireless communications field, such systems may face challenges due to self-interference; because reception and transmission occur at the same time on channels close in frequency, the received signal at a full-duplex transceiver may include undesired signal components from the signal being transmitted from that transceiver. The present application is directed to the use of self-interference cancellation circuits to remove these undesired signal components, in turn reducing self-interference.

Near band transceivers preferably sample transmission output as baseband digital signals, intermediate frequency (IF) analog signals, or as radio-frequency (RF) analog signals, but near band transceivers may additionally or alternatively sample transmission output in any suitable manner. This sampled transmission output may be used by near band transceivers to remove interference from received wireless communications data (e.g., as RF/IF analog signals or baseband digital signals). In many near band transceivers, an analog self-interference cancellation system is paired with a digital self-interference cancellation system. The analog cancellation system removes a first portion of self-interference by summing delayed and scaled versions of the RF transmit signal to create an RF self-interference cancellation signal, which is then subtracted from the RF receive signal. Alternatively, the analog cancellation system may perform similar tasks at an intermediate frequency. After the RF (or IF) receive signal has the RF/IF self-interference signal subtracted, it passes through an analog-to-digital converter of the receiver (and becomes a digital receive signal). After this stage, a digital self-interference cancellation signal (created by transforming a digital transmit signal) is then subtracted from the digital receive signal.

Figure 1:
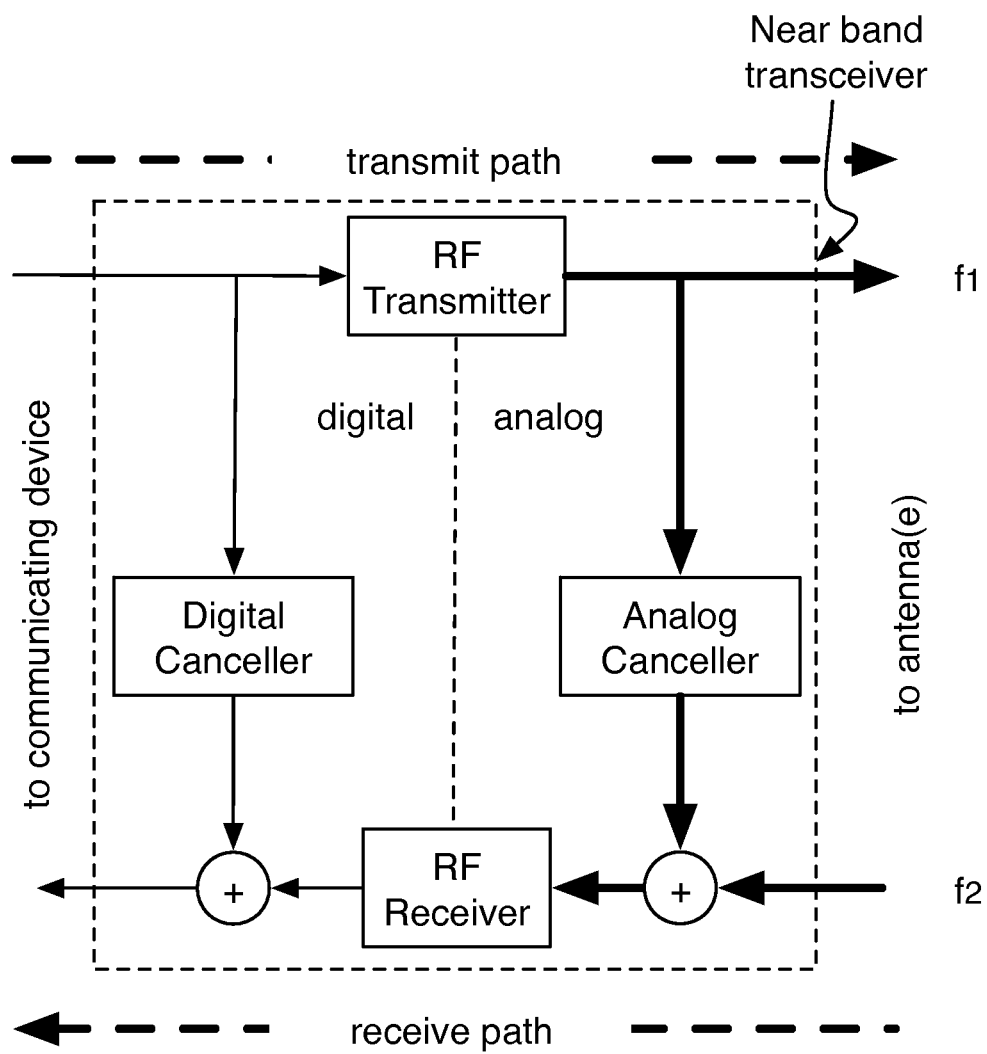
FIG. 1 is a schematic representation of a full-duplex transceiver.

The systems and methods described herein are preferably used to increase the performance of near band transceivers as shown in FIG. 1 (and other applicable systems) by removing self-interference, but may additionally or alternatively be used for any other applicable systems, including full-duplex transceivers, active sensing systems (e.g., RADAR), wired communications systems, wireless communications systems, and/or any other suitable system.

Near band transceivers may operate using similar principles to those described for full-duplex transceivers in U.S. patent application Ser. No. 14/569,354 and in U.S. patent application Ser. No. 14/643,795, the entireties of which are incorporated by this reference.

2. System for Near Band Interference Cancellation

Figure 2:
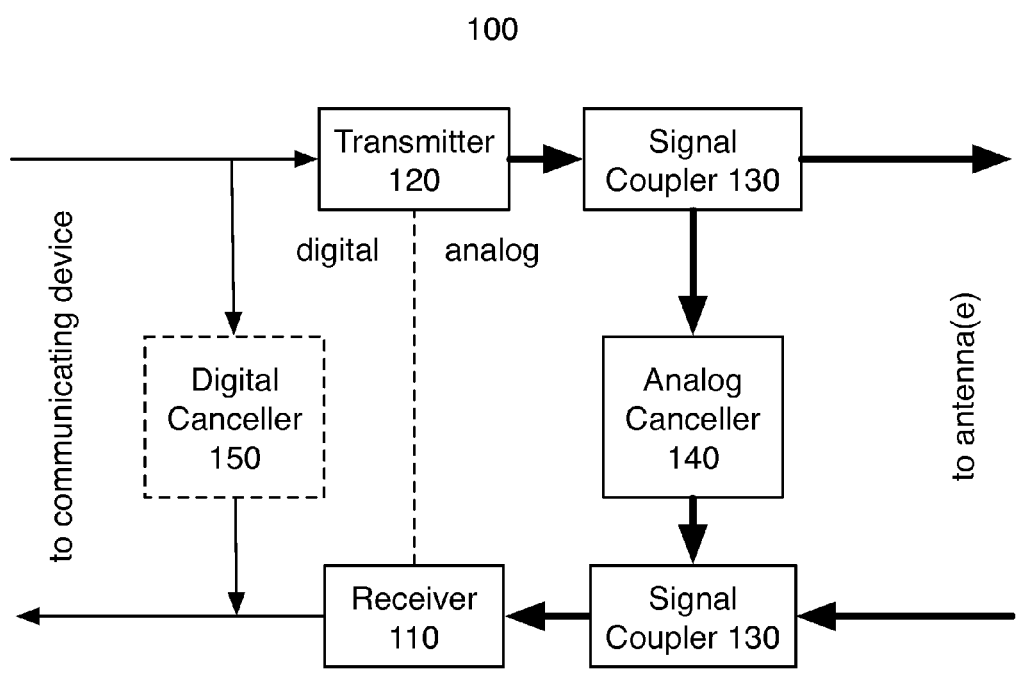
FIG. 2 is a schematic representation of a system of a preferred embodiment.

As shown in FIG. 2, a system 100 for near band interference cancellation includes a receiver 110, a transmitter 120, a signal coupler 130, and an analog self-interference canceller 140. The system may additionally or alternatively include a digital self-interference canceller 150.

The system 100 functions to increase the performance of near band transceivers (or other applicable systems) by performing near band interference cancellation. The system 100 is preferably used to remove self-interference, but may additionally or alternatively be used to remove any type of interference (including environmental noise, etc.).

The system 100 may perform self-interference cancellation by performing analog and/or digital self-interference cancellation based on any number of sampled analog and/or digital transmit signals. For example, the digital self-interference canceller 150 may sample an digital transmit signal, as shown in FIG. 2, but the digital self-interference canceller 150 may additionally or alternatively sample an analog transmit signal (e.g., through an ADC coupled to the analog transmit signal).

The system 100 preferably performs analog and digital self-interference cancellation simultaneously and in parallel, but may additionally or alternatively perform analog and/or digital self-interference cancellation at any suitable times and in any order.

The system 100 is preferably implemented using both digital and analog circuitry. Digital circuitry is preferably implemented using a general-purpose processor, a digital signal processor, an application specific integrated circuit (ASIC), a field programmable gate array (FPGA) and/or any suitable processor(s) or circuit(s). Analog circuitry is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components. The system 100 preferably includes memory to store configuration data, but may additionally or alternatively be configured using externally stored configuration data or in any suitable manner.

The receiver 110 functions to receive analog receive signals transmitted over a communications link (e.g., a wireless channel, a coaxial cable). The receiver 110 preferably converts analog receive signals into digital receive signals for processing by a communications system, but may additionally or alternatively not convert analog receive signals (passing them through directly without conversion). The receiver no is preferably tuned to receive signals in only the receive band, but may additionally or alternatively be tuned to receive signals in the transmit band or any other communication band.

The receiver no is preferably a radio-frequency (RF) receiver, but may additionally or alternatively be any suitable receiver.

The receiver 110 is preferably coupled to the communications link by a circulator-coupled RF antenna, but may additionally or alternatively be coupled to the communications link in any suitable manner. Some examples of alternative couplings include coupling via one or more dedicated receive antennas. In another alternative coupling, the receiver no may be coupled to the communications link by a duplexer-coupled RF antenna.

Figure 3:
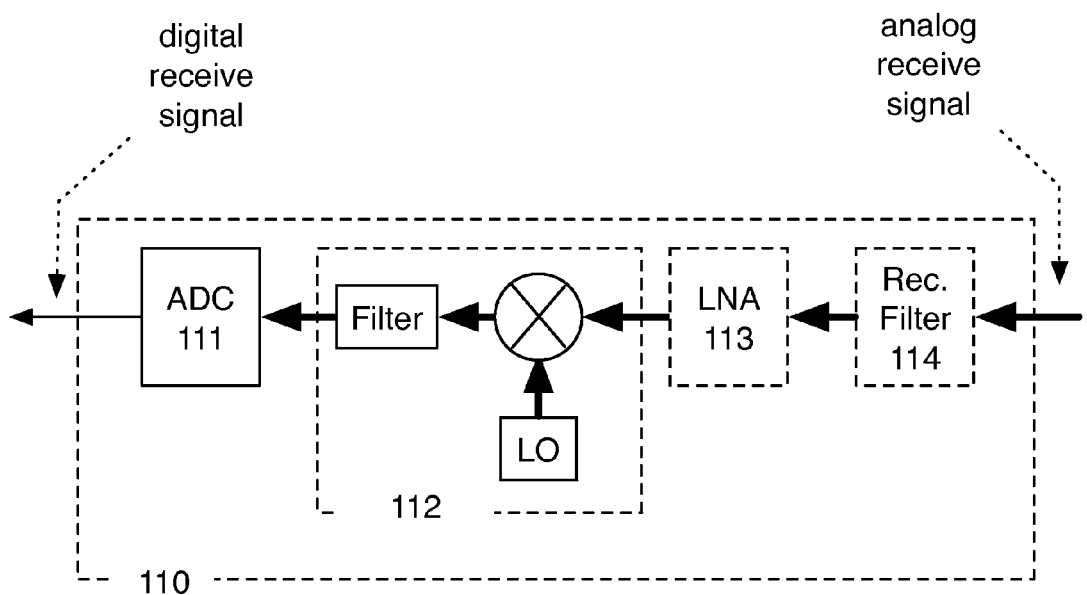
FIG. 3 is a schematic representation of a receiver of a system of a preferred embodiment.

The receiver no preferably includes an analog-to-digital converter (ADC) in, and a frequency downconverter 112 as shown in FIG. 3. The receiver 110 may additionally include a low-noise amplifier (LNA) 113 and/or a receive filter 114. The receiver no may additionally or alternatively include amplifiers, filters, signal processors and/or any other suitable components. In one variation of a preferred embodiment, the receiver 110 includes only analog processing circuitry (e.g., amplifiers, filters, attenuators, delayers). The receiver may function to scale, shift, and/or otherwise modify the receive signal. The downconverter 112 functions to downconvert the analog receive signal from RF (or any other suitable frequency) to a baseband analog receive signal, and the analog-to-digital converter (ADC) in functions to convert the baseband analog receive signal to a digital receive signal.

The ADC 111 may be any suitable analog-to-digital converter; e.g., a direct-conversion ADC, a flash ADC, a successive-approximation ADC, a ramp-compare ADC, a Wilkinson ADC, an integrating ADC, a delta-encoded ADC, a time-interleaved ADC, or any other suitable type of ADC. In one variation of a preferred embodiment, the ADC 111 is a wide-band ADC capable of receiving on both transmit and receive bands.

The frequency downconverter 112 functions to downconvert the carrier frequency of the analog receive signal to baseband, preparing it for conversion to a digital receive signal. The downconverter 112 preferably accomplishes signal downconversion using heterodyning methods, but may additionally or alternatively use any suitable upconversion methods.

The downconverter 112 preferably includes a local oscillator (LO), a mixer, and a baseband filter. The local oscillator functions to provide a frequency shift signal to the mixer; the mixer combines the frequency shift signal and the analog receive signal to create (usually two) frequency shifted signals, one of which is the baseband signal, and the baseband filter rejects signals other than the baseband analog receive signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The baseband filter is preferably a lowpass filter with a tunable low-pass frequency. Additionally or alternatively, the baseband filter may be a lowpass filter with a set low-pass frequency, or any other suitable type of filter (e.g., a bandpass filter). The baseband filter is preferably a passive filter, but may additionally or alternatively be an active filter. The baseband filter is preferably implemented with analog circuit components, but may additionally or alternatively be digitally implemented.

The receive filter 114 functions to reject undesired signals outside of the RF receive band prior to amplification by the LNA 113. If the receiver 110 does not include a receive filter, the function of the receive filter may be performed in part by the baseband filter of the downconverter 112.

The receive filter 114 is preferably a bandpass filter centered around a tunable radio frequency. Additionally or alternatively, the receive filter 114 may be a bandpass filter centered around a set radio frequency, or any other suitable type of filter. The receive filter 114 is preferably a passive filter, but may additionally or alternatively be an active filter. The receive filter 114 is preferably implemented with analog circuit components, but may additionally or alternatively be digitally implemented.

As previously mentioned, the receiver 110 preferably receives only on the receive band, but may additionally or alternatively receive on the transmit band or any other suitable band. The receiver no may receive on bands outside of the receive band using a number of techniques, including modifying downconverter 112 LO frequency, modifying downcoverter 112 baseband filter center frequency, and/or modifying receive filter 114 center frequency. The receiver no may additionally or alternatively have multiple signal paths, each tuned for different frequencies.

In a first embodiment, the receiver no includes a receive filter 114 that passes both transmit and receive bands, as well as a wide-band ADC in that is capable of receiving on both bands.

Figure 4A:
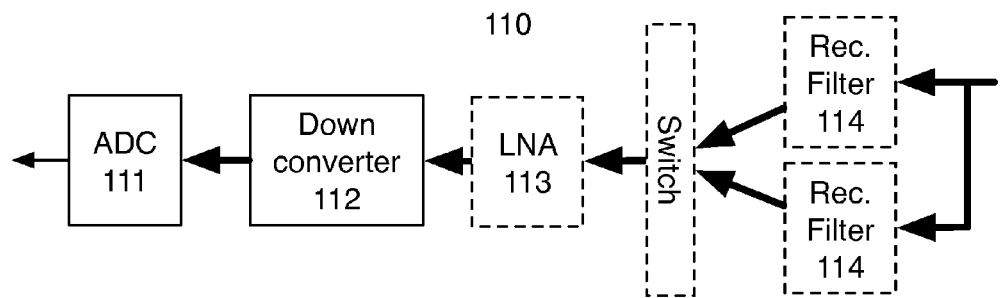
FIGS. 4A and 4B are schematic representations of receivers of a system of a preferred embodiment.
Figure 4B:
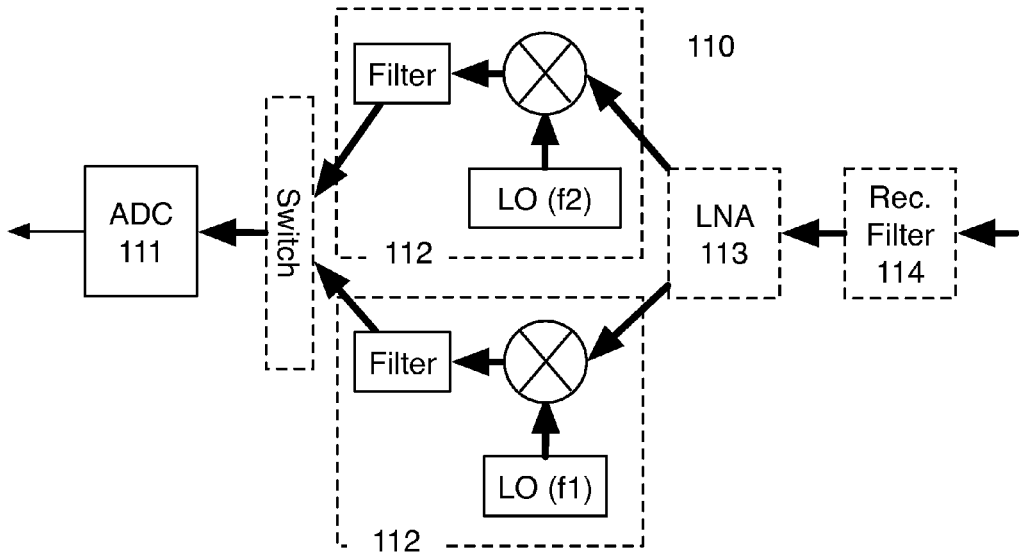
Figure 5:
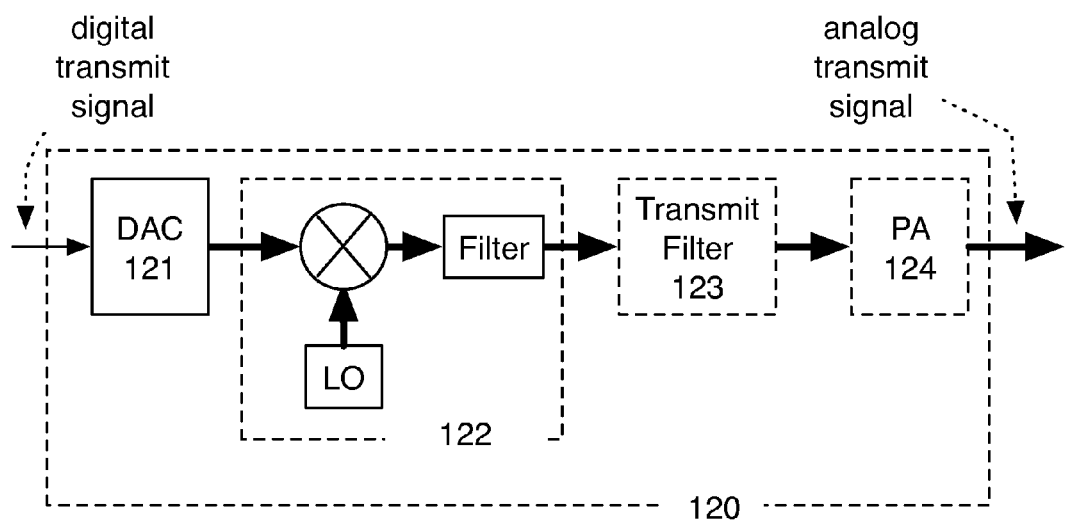
FIG. 5 is a schematic representation of a transmitter of a system of a preferred embodiment.

In a second embodiment, the receiver no includes separate signal paths that can be switched between to tune the receiver to different frequencies, as shown in FIGS. 4A and 4B. In one example, the receiver no switches between receiver filters 114, as shown in FIG. 4A. In a second example, the receiver no switches between downconverters 112, as shown in FIG. 4B. The location of the switches, number of switches, and where signal paths are switched may vary; for example, instead of switching between downconverters, the receiver no may switch between local oscillators at different frequencies (keeping the same baseband filter/mixer).

The transmitter 120 functions to transmit signals of the communications system over a communications link to a second communications system. The transmitter 120 preferably converts digital transmit signals into analog transmit signals.

The transmitter 120 is preferably tuned to transmit signals in only the transmit band, but may additionally or alternatively be tuned to transmit signals in the receive band or any other communication band.

The transmitter 120 is preferably a radio-frequency (RF) transmitter, but may additionally or alternatively be any suitable transmitter.

The transmitter 120 is preferably coupled to the communications link by a circulator-coupled RF antenna, but may additionally or alternatively be coupled to the communications link in any suitable manner. Some examples of alternative couplings include coupling via one or more dedicated transmit antennas. In another alternative coupling, the transmitter 120 may be coupled to the communications link by a duplexer-coupled RF antenna.

The transmitter 120 preferably includes a digital-to-analog converter (DAC) 121 and a frequency upconverter 122, as shown in FIG. 4. The transmitter 120 may additionally include a transmit filter 123 and/or a power amplifier 124. The transmitter 120 may additionally or alternatively include amplifiers, filters, signal processors and/or any other suitable components. The transmitter 120 may function to scale, shift, and/or otherwise modify the transmit signal. The digital-to-analog converter (DAC) 121 functions to convert the digital transmit signal to a baseband analog transmit signal, and the upconverter 122 functions to upconvert the baseband analog transmit signal from baseband to RF (or any other intended transmission frequency).

The DAC 121 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC. In one variation of a preferred embodiment, the DAC 121 is a wide-band DAC capable of transmitting on both transmit and receive bands.

The frequency upconverter 122 functions to upconvert the carrier frequency of the baseband analog transmit signal to a radio frequency, preparing it for transmission over the communications link. The upconverter 122 preferably accomplishes signal upconversion using heterodyning methods, but may additionally or alternatively use any suitable upconversion methods.

The upconverter 122 preferably includes a local oscillator (LO), a mixer, and an RF filter. The local oscillator functions to provide a frequency shift signal to the mixer; the mixer combines the frequency shift signal and the baseband analog transmit signal to create (usually two) frequency shifted signals, one of which is the RF analog transmit signal, and the RF filter rejects signals other than the RF analog transmit signal.

The local oscillator is preferably a digital crystal variable-frequency oscillator (VFO) but may additionally or alternatively be an analog VFO or any other suitable type of oscillator. The local oscillator preferably has a tunable oscillation frequency but may additionally or alternatively have a static oscillation frequency.

The mixer is preferably an active mixer, but may additionally or alternatively be a passive mixer. The mixer may comprise discrete components, analog ICs, digital ICs, and/or any other suitable components. The mixer preferably functions to combine two or more electrical input signals into one or more composite outputs, where each output includes some characteristics of at least two input signals.

The RF filter is preferably a bandpass filter centered around a tunable radio frequency. Additionally or alternatively, the RF filter may be a bandpass filter centered around a set radio frequency, or any other suitable type of filter. The RF filter is preferably a passive filter, but may additionally or alternatively be an active filter. The RF filter is preferably implemented with analog circuit components, but may additionally or alternatively be digitally implemented.

The transmit filter 123 functions to reject undesired signals outside of the RF transmit band prior to amplification by the PA 124. If the transmitter 120 does not include a transmit filter, the function of the transmit filter may be performed in part by the RF filter of the upconverter 122.

The transmit filter 123 is preferably a bandpass filter centered around a tunable radio frequency. Additionally or alternatively, the transmit filter 123 may be a bandpass filter centered around a set radio frequency, or any other suitable type of filter. The transmit filter 123 is preferably a passive filter, but may additionally or alternatively be an active filter. The transmit filter 123 is preferably implemented with analog circuit components, but may additionally or alternatively be digitally implemented.

As previously mentioned, the transmitter 120 preferably transmits only on the transmit band, but may additionally or alternatively transmit on the receive band or any other suitable band. The transmitter 120 may transmit on bands outside of the transmit band using a number of techniques, including modifying upconverter 122 LO frequency, modifying upconverter 122 RF filter center frequency, and/or modifying transmit filter 123 center frequency. The transmitter 120 may additionally or alternatively have multiple signal paths, each tuned for different frequencies.

In a first embodiment, the transmitter 120 includes a transmit filter 123 that passes both transmit and receive bands, as well as a wide-band DAC 121 that is capable of transmitting on both bands.

Figure 6:
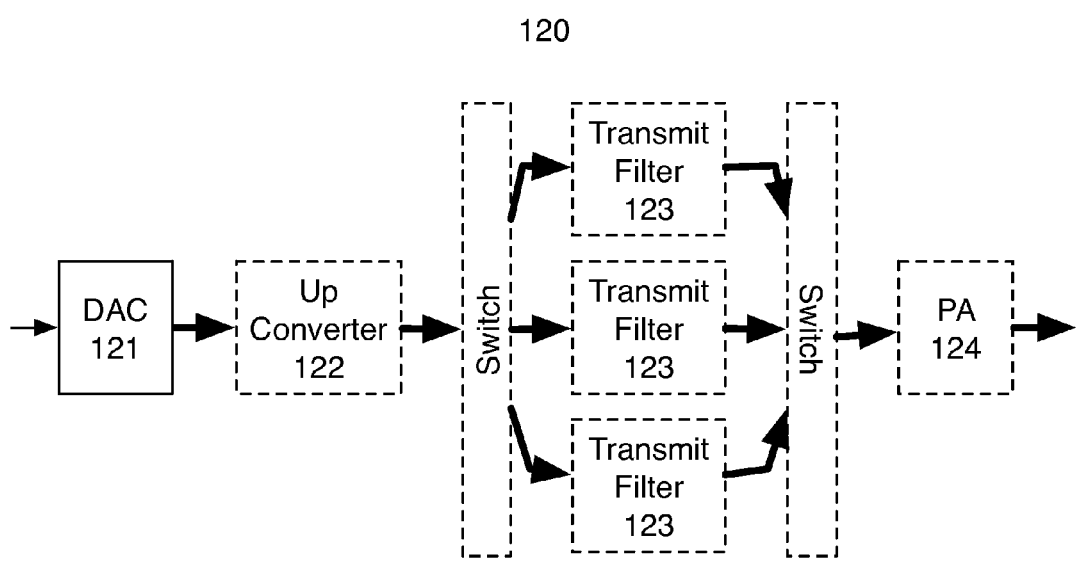
FIG. 6 is a schematic representation of a transmitter of a system of a preferred embodiment.

In a second embodiment, the transmitter 120 includes separate signal paths that can be switched between to tune the transmitter to different frequencies. In one example, the transmitter 120 switches between transmit filters 123, as shown in FIG. 6. In a second example, the transmitter switches between upconverters 122 (analogously to how the receiver 110 switches between downconverters 112, as shown in FIG. 4B). The location of the switches, number of switches, and where signal paths are switched may vary; for example, instead of switching between upconverters 122, the transmitter 120 may switch between local oscillators at different frequencies (keeping the same RF filter/mixer).

The transmitter 120 may include a digital pre-distortion (DPD) circuit. The DPD circuit is preferably used to improve linearity of the power amplifier 124, but may additionally or alternatively be used to monitor the gain and phase of the receive path. The DPD circuit may be connected to both the transmit path and the receive path, but may additionally or alternatively switch between transmit and receive paths (or be connected to only one).

The switches described previously may be any suitable switches; and may select one or more outputs. For example, a two input/one output switch might have four binary states, 00, 10, 01, and ii (where 00 corresponds to both inputs disconnected from the output, 10 corresponds to the first input connected to the output and the second input disconnected from the output, etc.). As another example, a two input/one output switch may have only two states: 10 or 01.

Figure 7:
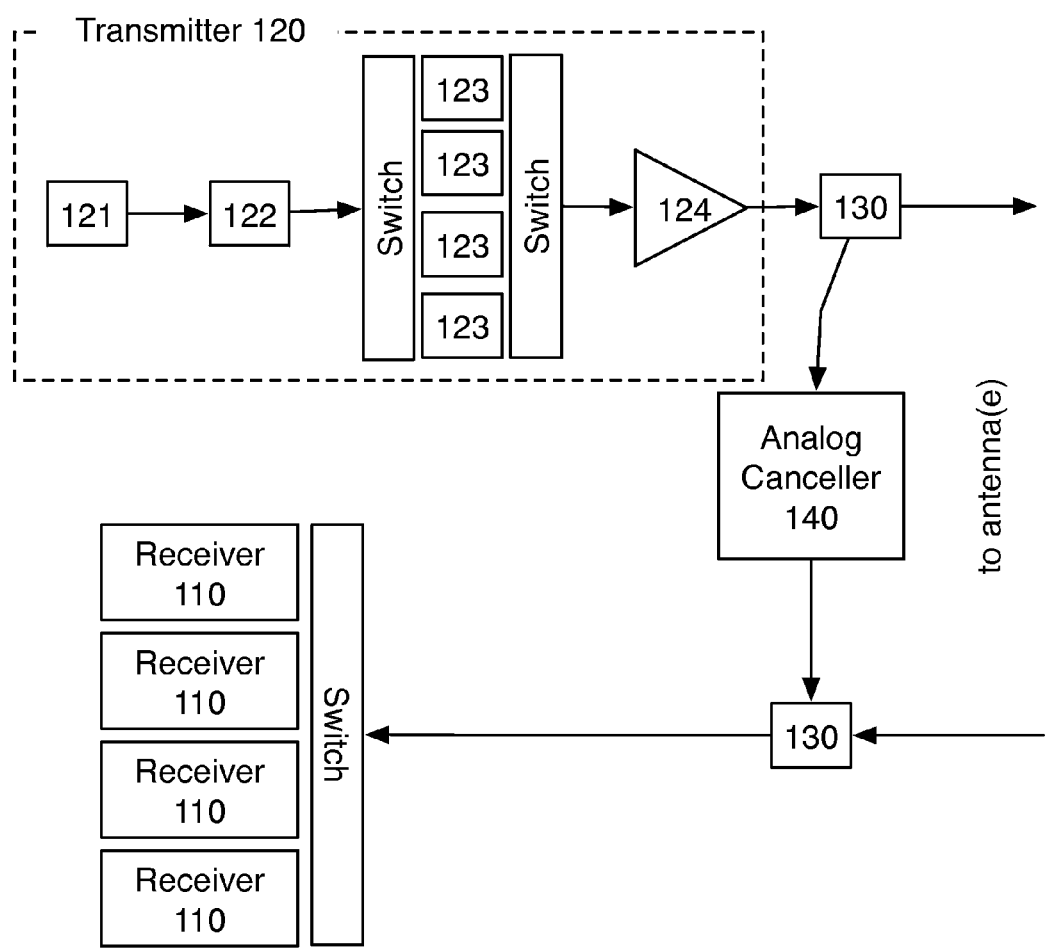
FIG. 7 is a schematic representation of a system of a preferred embodiment.

While the ability to switch transmission and/or reception bands may be used to allow the receiver 110 to sample the transmit band (or vice versa), the ability to switch bands may additionally or alternatively be used in multimode near band transceivers. For example, an eight band transceiver is as shown in FIG. 7. While the eight band transceiver in this example includes four separate receivers and only one transmitter, a multi-band transceiver may include any number of receivers and/or transmitters (and may split signals in any suitable manner across them).

Figure 8:
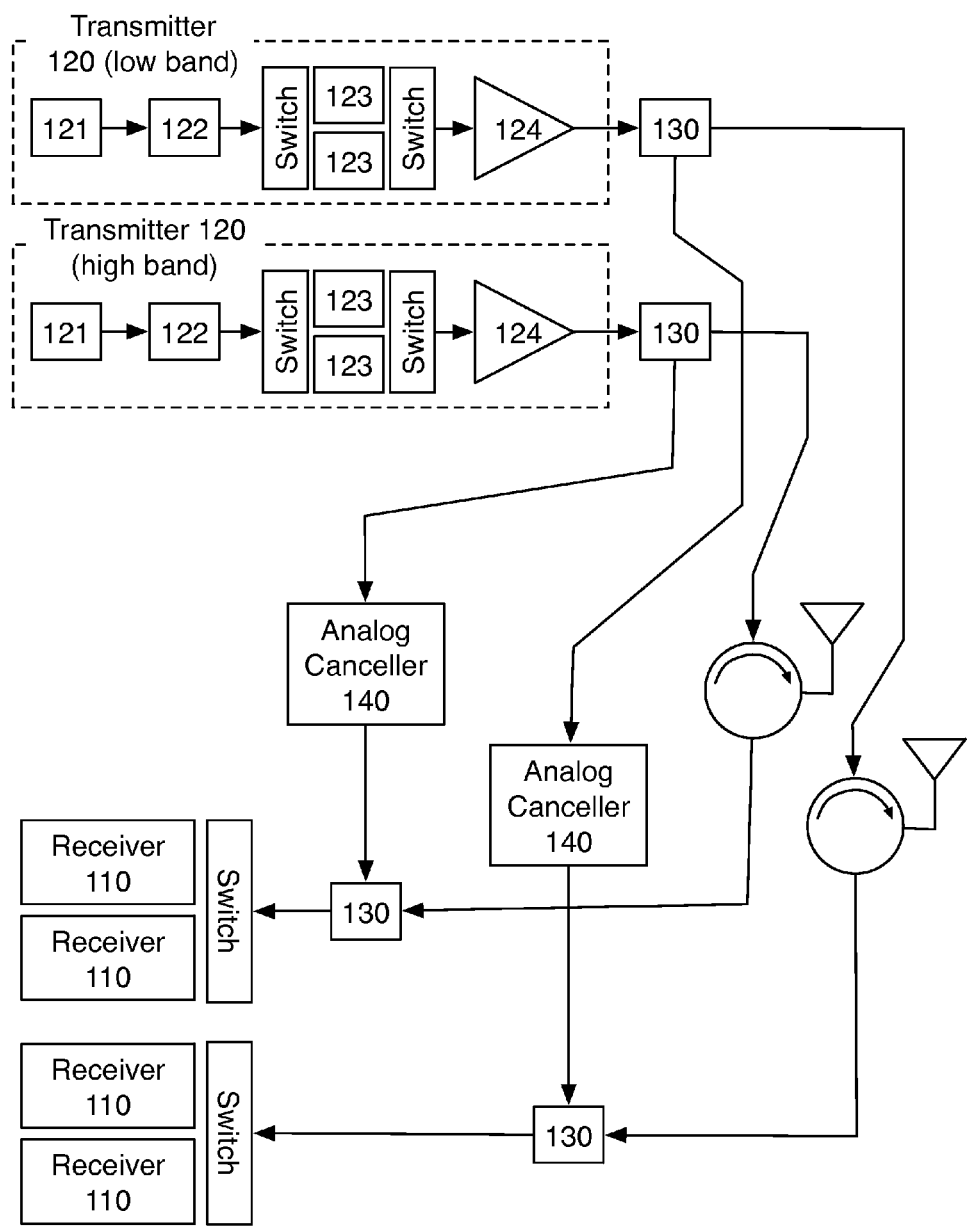
FIG. 8 is a schematic representation of a system of a preferred embodiment.

As a related example, the ability to switch bands may be useful in particular for transceivers capable of carrier aggregation. As shown in FIG. 8, an eight band transceiver includes two transmitters, each corresponding to a different carrier (a high band carrier and a low band carrier). Each carrier in turn corresponds to two frequency sub-bands.

The system 100 may be scaled to support any number of bands, sub-bands, or carriers. As seen in FIGS. 7 and 8, the architecture of the system 100 is such that is scales linearly with the number of supported carriers (in contrast to a duplexer-enabled transceiver, in which duplexer numbers scale exponentially with number of supported carriers).

Figure 9A:
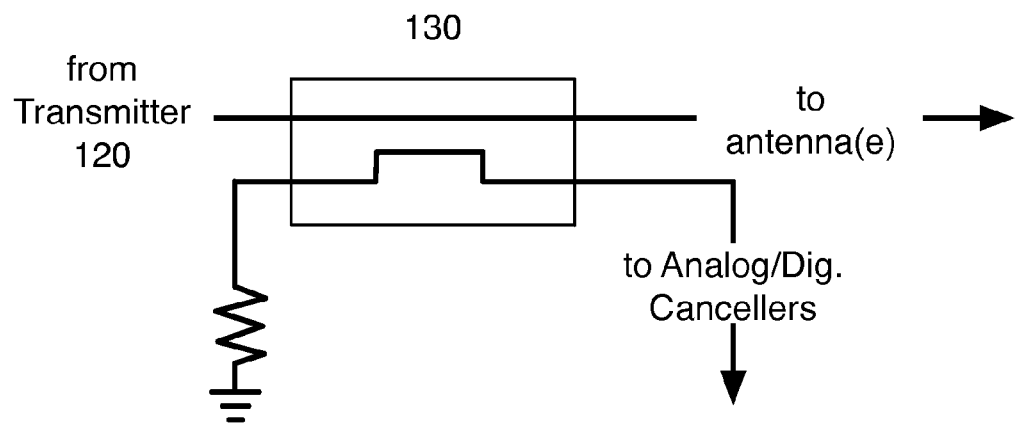
FIGS. 9A and 9B are schematic representations of signal couplers of a system of a preferred embodiment.
Figure 9B:
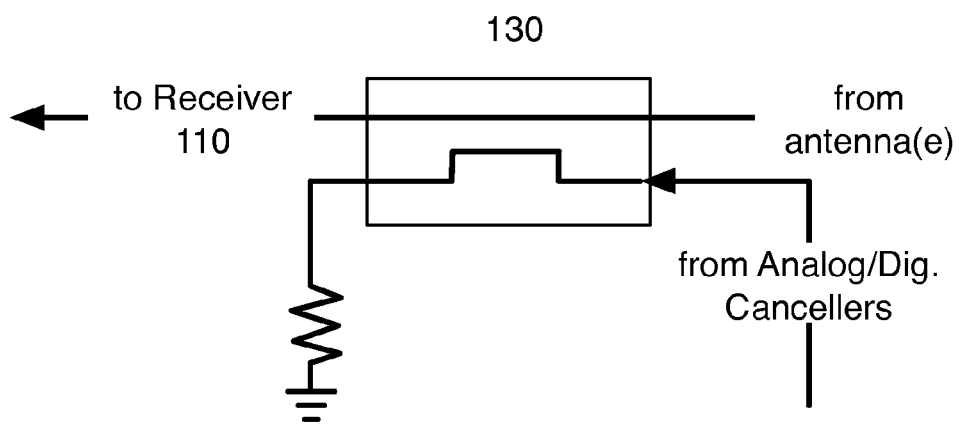

The signal coupler 130, as shown in FIGS. 9A and 9B, functions to allow signals to be split and/or joined. The signal coupler 130 may be used to provide a sample of the analog transmit signal for the analog canceller 140 and/or the digital canceller 150, as shown in FIG. 9A; that is, the signal coupler 130 may serve as a transmit coupler. The signal coupler 130 may also be used to combine one or more analog self-interference cancellation signals (from analog/digital cancellers) with the analog receive signal, as shown in FIG. 9B; that is, the signal coupler 130 may serve as a receive coupler. Additionally or alternatively, the signal coupler 130 may be used for any other purpose.

If the signal coupler 130 is used as a transmit coupler (which is assumed for the remainder of this paragraph), the signal coupler 130 is preferably directly coupled to the transmitter 120, but may additionally or alternatively be coupled indirectly to the transmitter 120 and/or be coupled to another suitable RF transmission source. The signal coupler 130 preferably has at least two outputs; one coupled to antenna(e) (directly or indirectly) and another coupled to one or more of the analog canceller 140 and the digital canceller 150. The signal coupler 130 preferably routes the majority of input power to the antenna(e) output port, but may additionally or alternatively route power in any suitable manner (e.g., routing the majority of power to other output ports). The signal coupler 130 may have any number of input and output ports, including bidirectional input/output ports.

If the signal coupler 130 is used as a receive coupler (which is assumed for the remainder of this paragraph), the receive coupler is preferably directly to the receiver no, but may additionally or alternatively be coupled indirectly to the receiver no and/or be coupled to another suitable RF receiver. The signal coupler 130 preferably has at least two inputs, one coupled to antenna(e) of the full-duplex radio (directly or indirectly) and another coupled to one or more of the analog canceller 140 and the digital canceller 150. The signal coupler 130 preferably couples the majority of power from both input ports to the receiver output port; this coupling preferably results in the receiver output port outputting a sum of one or more self-interference cancellation signals (generated by cancellers 140/150) and the RF receive signal (received at the antenna(e)). Additionally or alternatively, the signal coupler 130 may couple or route power in any suitable manner. The signal coupler 130 may have any number of input and output ports, including bidirectional input/output ports.

The signal coupler 130 is preferably a short section directional transmission line coupler, but may additionally or alternatively be any power divider, power combiner, directional coupler, or other type of signal splitter. The signal coupler 130 is preferably a passive coupler, but may additionally or alternatively be an active coupler (for instance, including power amplifiers). For example, the signal coupler 130 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the signal coupler 130 are preferably phase-shifted by ninety degrees, but may additionally or alternatively be in phase or phase shifted by a different amount (e.g., zero degrees, 180 degrees).

The system 100 preferably includes two signal couplers 130 (a transmit and a receive coupler); these signal couplers 130 preferably connect to a single antenna through a duplexer or circulator, but may additionally or alternatively connect to multiple antennae. In one example, the transmit coupler and receive coupler connect to two separate antennae (e.g., a transmit antenna and a receive antenna); in another example, the transmit coupler and receive coupler both connect to the same two antennae. The transmit coupler and receive coupler may additionally or alternatively connect to any suitable RF transmit and RF receive sources (e.g., an RF signal transmitted solely over coaxial cable). There may additionally or alternatively be filters, power amplifiers, and/or any other RF signal modifying components between the couplers 130 and antennae.

The analog self-interference canceller 140 functions to produce an analog self-interference cancellation signal from the analog transmit signal that can be combined with the analog receive signal to reduce self-interference present in the analog receive signal. The analog self-interference canceller 140 is preferably designed to sample a transmit signal at a single transmit frequency band and produce a self-interference cancellation signal at a single receive frequency band, but may additionally or alternatively be designed to operate at a single radio frequency (RF) band, at multiple RF bands, at one or multiple intermediate frequency (IF) bands, or at any suitable frequency band.

The analog self-interference canceller 140 is preferably implemented as an analog circuit that transforms an RF transmit signal into an analog self-interference cancellation signal by combining a set of filtered, scaled, and/or delayed versions of the RF transmit signal, but may additionally or alternatively be implemented as any suitable circuit. For instance, the analog self-interference canceller 140 may perform a transformation involving only a single version or copy of the RF transmit signal. The transformed signal (the analog self-interference cancellation signal) preferably represents at least a part of the self-interference component received at the receiver 110.

The analog self-interference canceller 140 is preferably adaptable to changing self-interference parameters in addition to changes in the analog transmit signal; for example, RF transceiver temperature, ambient temperature, antenna configuration, humidity, and RF transmitter power. Adaptation of the analog self-interference canceller 140 is preferably performed by a tuning circuit, but may additionally or alternatively be performed by a control circuit or other control mechanism included in the canceller 140 or any other suitable controller.

The analog self-interference canceller 140 is preferably substantially similar to the analog self-interference canceller of U.S. patent application Ser. No. 14/643,795, but may additionally or alternatively be any suitable analog self-interference canceller.

The analog self-interference canceller 140 is preferably configured by adjusting configuration parameters such as processing settings (at signal dividers), filter center frequency and/or Q factor (at tunable filters), scale factor (at scalers), delay (at delayers), post-processing settings (at signal combiners) and/or any other suitable configuration parameters. Configuration states are preferably set based upon received RF/IF transmit signals, but may additionally or alternatively be set based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the receive signal.

Configuration states are preferably set based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, configuration states may be set in any suitable manner. Configuration states may be adapted using analytical methods, online gradient-descent methods (e.g., LMS, RLMS), and/or any other suitable methods.

The digital self-interference canceller 150 functions to produce a digital self-interference cancellation signal from a digital transmit signal. The digital self-interference cancellation signal is preferably converted to an analog self-interference cancellation signal (by a DAC) and combined with the analog self-interference cancellation signals to further reduce self-interference present in the RF receive signal at the receiver 110. Additionally or alternatively, the digital self-interference cancellation signal may be combined with a digital receive signal.

The digital self-interference canceller 150 preferably samples the RF transmit signal of the transmitter 120 using an ADC (additionally or alternatively, the canceller 150 may sample the digital transmit signal or any other suitable transmit signal) and transforms the sampled and converted RF transmit signal to a digital self-interference signal based on a digital transform configuration. The digital transform configuration preferably includes settings that dictate how the digital self-interference canceller 150 transforms the digital transmit signal to a digital self-interference signal (e.g. coefficients of a generalized memory polynomial used to transform the transmit signal to a self-interference signal).

The digital self-interference canceller 150 may be implemented using a general-purpose processor, a digital signal processor, an application specific integrated circuit (ASIC), a field programmable gate array (FPGA) and/or any suitable processor(s) or circuit(s). The digital self-interference canceller 150 preferably includes memory to store configuration data, but may additionally or alternatively be configured using externally stored configuration data or in any suitable manner. In one implementation, the digital self-interference canceller 150 is substantially similar to the digital self-interference canceller of U.S. patent application Ser. No. 14/456,320, filed 11 Aug. 2014, which is incorporated in its entirety by this reference.

The digital self-interference canceller 150 may couple to transmit and receive signals in a number of ways. For example, the digital self-interference canceller 150 may use a converted RF transmit signal as input as well as provide a converted digital self-interference cancellation signal as output. As another example, the digital self-interference canceller 150 may use the digital transmit signal as input as a well as provide a digital self-interference cancellation signal as output (directly to the digital receive signal). The digital self-interference canceller may additionally or alternatively couple to transmit signals in any combination of digital and analog receive signals.

Note that while these examples reference the RF transmit signal and RF receive signal, the digital self-interference canceller 150 may additionally or alternatively couple to IF transmit signals and/or IF self-interference cancellation signals.

Though the cancellers 140/150 are preferably coupled to signal couplers 130 located after transmitter 120 outputs and before receiver no inputs, the cancellers 140/150 may additionally or alternatively be coupled to intermediate outputs and/or inputs (e.g., an output before the transmitter 120 output or an input after the receiver no input).

3. Method for Near Band Interference Cancellation

Figure 10:
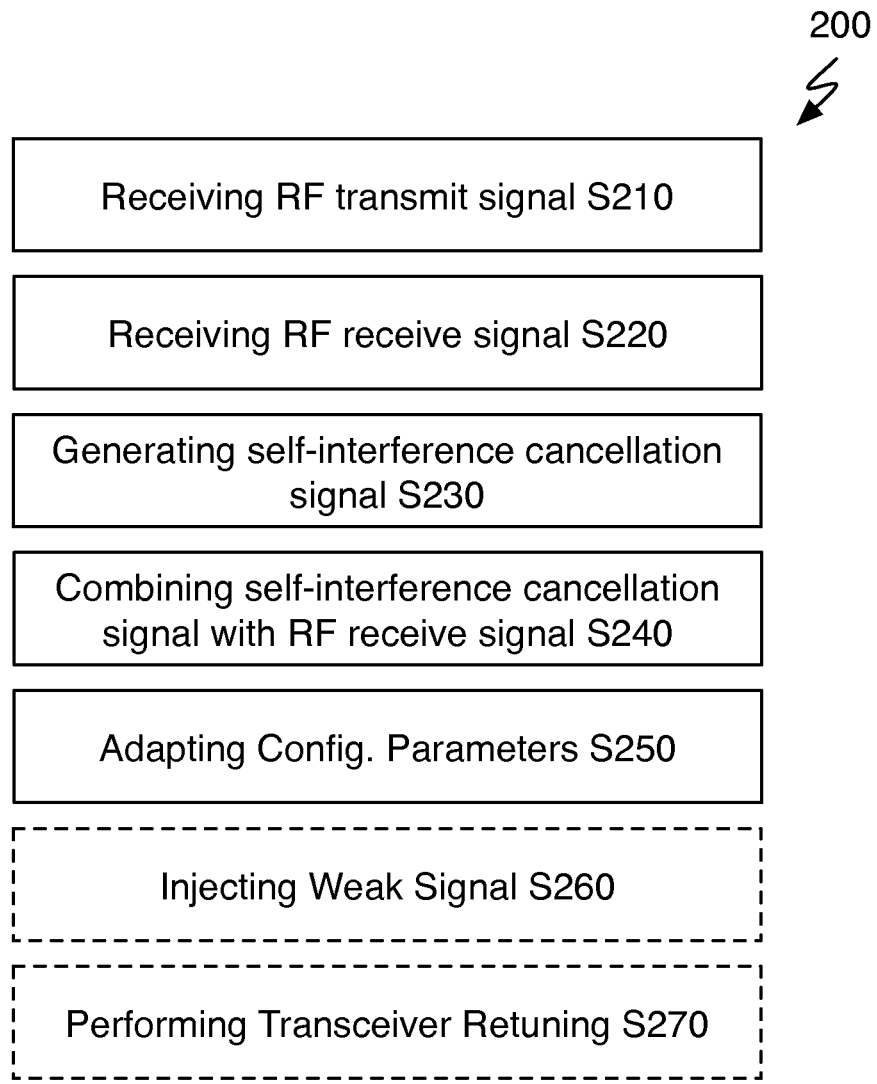
FIG. 10 is a chart representation of a method of a preferred embodiment.

As shown in FIG. 10, a method 200 for self-interference cancellation includes receiving an RF transmit signal S210, receiving an RF receive signal S220, generating a self-interference cancellation signal S230, combining the self-interference cancellation signal with the RF receive signal S240, and adapting configuration parameters S250. The method 200 may additionally include injecting a weak signal S260, and/or performing transceiver retuning S270.

The method 200 functions to increase the performance of near band transceivers (or other applicable systems) by performing near band interference cancellation. The method 200 is preferably used to remove self-interference, but may additionally or alternatively be used to remove any type of interference (including environmental noise, etc.).

The method 200 is preferably implemented by the system 100, but may additionally or alternatively be implemented by any suitable near band communications system.

Step S210 includes receiving an RF transmit signal. Step S210 functions to provide an analog RF signal intended for transmission by a near band wireless communications system so that the signal may be used to remove self-interference at the near band wireless communications system receiver. RF transmit signals received in S210 preferably include RF signals originating from an electronic device, destined for an antenna or other communication output of a radio (or other wireless communications system). RF transmit signals received in S210 may additionally or alternatively include RF transmit signals from any other suitable source.

Step S210 preferably comprises receiving the RF transmit signal by splitting an RF signal somewhere in the signal path between the RF transmitter and the antenna(e) (or other signal output) and passing the RF transmit signal to an frequency downconverter, but may additionally or alternatively receive the RF transmit signal using any other suitable method.

Step S220 includes receiving an RF receive signal. Step S220 functions to provide an analog RF signal received by a near band wireless communications system. This analog receive signal preferably contains communication signals intended for the near band wireless communication signal, but may also contain undesired signals and/or interference. The analog receive signal is preferably combined with an interference cancelling signal to isolate desired signals. RF receive signals received in S220 preferably include RF signals transmitted from an electronic device. RF receive signals received in S220 may additionally or alternatively include RF receive signals from any other suitable source.

The RF transmit and RF receive signals are preferably substantially contained within different frequency bands, though the bands may overlap. Additionally or alternatively, the RF transmit and RF receive signals may be substantially contained within the same frequency band. The RF transmit signal band is hereafter referred to as the transmit band and the RF receive signal band is hereafter referred to as the receive band.

Step S230 includes generating a self-interference cancellation signal. Step S230 preferably includes transforming an RF transmit signal into the self-interference cancellation signal, but may additionally or alternatively taking either or both of the RF transmit signal and the RF receive signal as input to a transformation that generates the self-interference cancellation signal.

The self-interference cancellation signal preferably functions to reduce interference in the receive band due to leakage of the RF transmit signal into the receive band, but may additionally or alternatively function to reduce interference in any band, due to any cause.

Step S230 preferable includes generating a self-interference cancellation signal by combining a set of filtered, scaled, and/or delayed versions of the RF transmit and/or RF receive signals, but may additionally or alternatively include generating a self-interference cancellation signal in any suitable manner.

The transformation performed in Step S230 is preferably adaptable to changing self-interference parameters in addition to changes in the RF transmit and receive signals; for example, RF transceiver temperature, ambient temperature, antenna configuration, humidity, and RF transmitter power.

In one implementation of a preferred embodiment, Step S230 includes dividing input signals into signal components by frequency sub-band, scaling signal components, delaying signal components, and recombining signal components. This implementation separates input signals into frequency sub-bands; enabling the generation of effective self-interference signal even when self-interference is highly variable with frequency.

Frequency sub-bands may overlap in frequency; there may additionally or alternatively be multiple signal components corresponding to the same frequency sub-band. In some cases, frequency sub-bands may encompass the entire transmit and receive bands.

Scaling signal components function to effectively multiply the input signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Thus, scaling also functions to provide weighting for the combination of self-interference cancellation components (e.g., a signal with scale factor 2 is weighted twice as heavily as one with a scale factor of 1). Scaling may include attenuating, amplifying, and/or inverting phase. Scaling parameters are preferably controlled dynamically, but may additionally or alternatively be static.

Delaying signal components preferably matches corresponding delays in received self-interference. The delay introduced in each signal component is preferably variable (and controlled dynamically) but may additionally or alternatively be set.

After delaying and/or scaling, input signal components are transformed into self-interference cancellation signal components, which may be combined to form a self-interference cancellation signal.

Step S240 includes combining the self-interference cancellation signal with the RF receive signal. Step S240 functions to couple the self-interference cancellation signal generated by the method 200 to the RF receive signal of the near band radio. Step S240 preferably includes coupling the majority of input power to the RF receiver signal; this coupling preferably results in the RF receiver receiving a sum of the self-interference cancellation signal (generated by the method 200) and the RF receive signal (received at the antenna(e)). Additionally or alternatively, Step S240 may include coupling or routing power in any suitable manner.

Step S250 includes adapting configuration parameters. Step S250 functions to control the transformation parameters used to generate the self-interference cancellation signal of Step S230.

Self-interference received by the receiver (on the receive band and/or any other suitable band) may be modeled as follows:

$$Rx = Tx(H - \hat{H})$$

where Rx represents the self-interference component of the RF receive signal (after cancellation), Tx represents the RF transmit signal (on the receive band), H represents the self-interference channel (which relates the transmit signal to the received self-interference through a transformation) and $\hat{H}$ represents the response of an analog self-interference cancellation circuit (related to the effect of the self-interference cancellation signal, $Tx\hat{H}$). Received self-interference is reduced by increasing similarity between H and $\hat{H}$; that is, matching the self-interference cancellation response to the self-interference channel.

Configuration parameters adapted by Step S250 may include any parameters of self-interference cancellation circuits. Some examples of configuration parameters that may be adapted by Step S250 include the number of transmit signal divisions, the center frequencies and bandwidths of the sub-bands for each division, scaling factors, delays, and/or post-processing settings. In one embodiment, configuration parameters comprise a set of complex weights (e.g., a scaling factor and/or a phase change factor) and a set of delays. These configuration parameters can then be translated into self-interference canceller settings.

Step S250 preferably includes adapting configuration parameters based on knowledge of transmit and receive signals in the receive band (e.g., Tx and Rx). In one embodiment, a class of constrained optimization algorithms can be used in estimating self-interference channel using knowledge of the transmit and receive channel signals. Constrained optimization algorithms include augmented Lagrangian methods (e.g., Alternating Direction Method of Multipliers (ADMM)), first order optimization algorithms (e.g., gradient descent) and the like. In one embodiment, constrained optimization algorithms are used along with Transmit and/or Receive channel knowledge to find configuration parameters minimizing $(H-\hat{H})$.

In a variation of a preferred embodiment, Step S250 may include adapting configuration parameters without knowledge of both transmit and receive signals (i.e., knowledge of one or zero of the transmit and receive signals). In this variation, a set of adaptation iterations may be utilized to estimate the self-interference channel.

In this variation, Step S250 preferably includes estimating the ratio of the receive and transmit channels $$\frac{Rx}{Tx} = H - \hat{H}$$

by performing iterative measurements to determine the RX/TX ratio.

The magnitude and phase of the RX/TX ratio are preferably determined by measuring the magnitude of the Rx signal (i.e., the residual component of self-interference present in the receive signal after self-interference cancellation) at multiple cancellation circuit settings, where each cancellation circuit setting corresponds to a different phase response.

To measure the Rx signal, the composite receive signal (i.e., the receive signal after self-interference cancellation) is preferably measured during a period where transmit signal noise dominates the composite receive signal (i.e., transmit signal noise is substantially greater in magnitude than any other signal component of the composite receive signal). Correspondingly, Step S250 may include detecting that transmit signal noise is the dominant component of the composite receive signal.

The Tx signal is preferably assumed to be constant (for a given transmit power). Since the self-interference cancellation channel is known for each cancellation circuit setting (e.g., a set of cancellation parameters), the change in magnitude of the Rx signal (and thus Rx/Tx, for constant Tx) be correlated to the change in response of the self-interference cancellation channel; from this correlation, Rx/Tx and the self-interference channel H can be determined, and the self-interference cancellation channel can be optimized to reduce self-interference. For example, the receive signal may be measured at two times (during a period where transmit signal noise is dominant).

Receive signal $1 \approx Rx_1$, Receive signal $2 \approx Rx_2$ $Rx_1 = Tx(H - \hat{H}_1)$ $Rx_2 = Tx(H - \hat{H}_2)$ from these equations, H can be determined, and $\hat{H}$ can be tuned to reduce self-interference.

Step S260 includes injecting a weak signal. Step S260 functions to inject a known, weak signal on the receive band in order to assist in determining transmitted signals in the receive band. The signal is preferably weak in order to minimize transmit noise injected in the receive band. This signal can be used in order to determine the self-interference channel (e.g., providing knowledge of TX above to determine H).

The weak signal is preferably a noise signal with known characteristics, but may additionally or alternatively be any suitable signal (e.g., a chirp signal, an OFDM frame).

Step S270 includes performing transceiver retuning. Step S270 functions to change one or both of transmitter and receiver tuning; for example, to transmit a signal on the receive band, the transmitter must be retuned. Likewise, to receive a signal on the transmit band, the receiver must be retuned.

Transceiver retuning may be accomplished in a number of ways. Step S270 preferably includes performing transceiver retuning by altering the local oscillator frequency of the transmitter and/or receiver, but may additionally or alternatively include retuning by alternating signal paths and/or altering filter center frequencies (as described in sections of the system 100).

Transmitter and/or receiver retuning may occur at any time. In one embodiment, the transmitter and receiver are retuned only during intermittent tuning periods.

Transceiver retuning may be used to generate knowledge of transmit and receive channels (to be used for configuration purposes).

The methods of the preferred embodiment and variations thereof can be embodied and/or implemented at least in part as a machine configured to receive a computer-readable medium storing computer-readable instructions. The instructions are preferably executed by computer-executable components preferably integrated with a system for self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A method for self-interference canceller tuning for a near band radio comprising:
    receiving, in a first frequency band, an RF transmit signal of the near band radio;
    receiving, in a second frequency band, an RF receive signal of the near band radio;
    retuning a transmitter of the near band radio from the first frequency band to the second frequency band;
    transmitting a weak signal on the second frequency band;
    retuning the transmitter of the near band radio from the second frequency band to the first frequency band;
    generating knowledge of a receive channel based on the weak signal;
    generating a self-interference cancellation signal from the RF transmit signal based on a set of configuration parameters; wherein generating the self-interference cancellation signal comprises combining a set of filtered, scaled, and delayed versions of the RF transmit signal;

combining the self-interference cancellation signal with the RF receive signal to create a composite receive signal; and adapting the set of configuration parameters based on the composite receive signal; wherein adapting the set of configuration parameters based on the composite receive signal comprises adapting scaling factors and delays;

wherein the first frequency band and second frequency band are non-identical.

2. The method of claim 1, wherein adapting the set of configuration parameters comprises adapting a set of complex weights and a set of delays.

3. The method of claim 1, wherein adapting the set of configuration parameters further comprises using a constrained optimization algorithm to adapt configuration parameters based on knowledge of transmit and receive channels of the near band radio.

4. The method of claim 3, further comprising performing transceiver retuning to generate the knowledge of transmit and receive channels.

5. The method of claim 3, wherein the constrained optimization algorithm is an alternating direction method of multipliers algorithm.

6. The method of claim 1, wherein adapting the set of configuration parameters further comprises estimating a self-interference channel from a ratio of receive and transmit channels and adapting the set of configuration parameters based on the estimated self-interference channel.

7. The method of claim 6, wherein estimating a self-interference channel from a ratio of receive and transmit channels comprises:

measuring a first magnitude of the composite receive signal, wherein the first magnitude is measured for a first set of configuration parameters;

measuring a second magnitude of the composite receive signal, wherein the second magnitude is measured for a second set of configuration parameters; and determining self-interference channel phase and magnitude from a difference of the first magnitude and the second magnitude and from a difference of the first set of configuration parameters and the second set of configuration parameters.

8. The method of claim 7, further comprising detecting that transmit signal noise is a dominant component of the composite receive signal.

9. The method of claim 6, wherein adapting the set of configuration parameters further comprises adapting the set of configuration parameters using a constrained optimization algorithm.

10. The method of claim 1, wherein the weak signal is a noise signal with known characteristics.

11. The method of claim 1, wherein retuning the transmitter comprises changing a local oscillator frequency of the transmitter.

12. The method of claim 1, wherein retuning the transmitter comprises changing a signal path of the transmitter.

* * * * *